Figure 1:
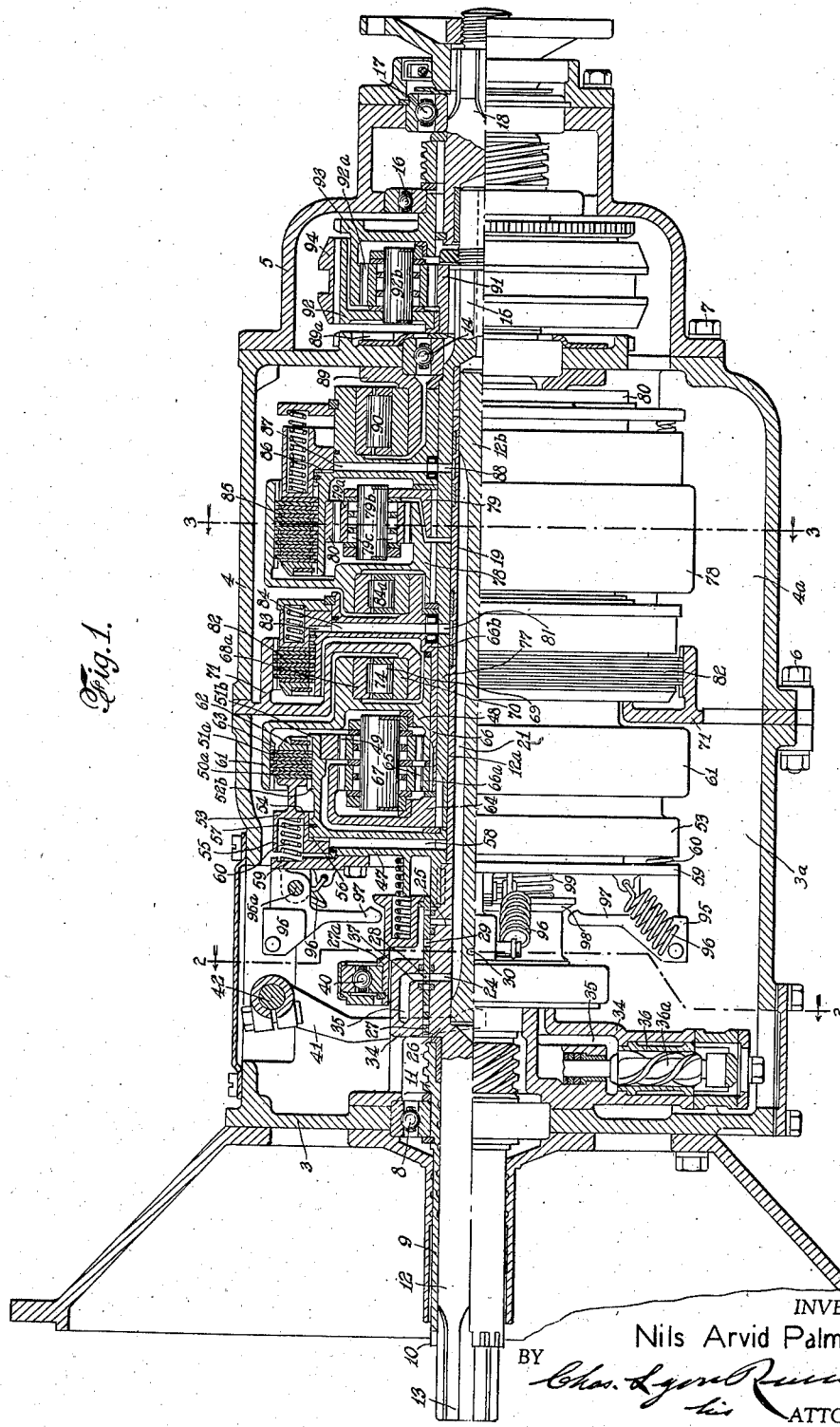

Jan. 17, 1939.  N. A. PALMGREN  2,144,270
VARIABLE SPEED TRANSMISSION MECHANISM
Filed Feb. 27, 1936  4 Sheets-Sheet 1

INVENTOR.
Nils Arvid Palmgren
BY
ATTORNEY.

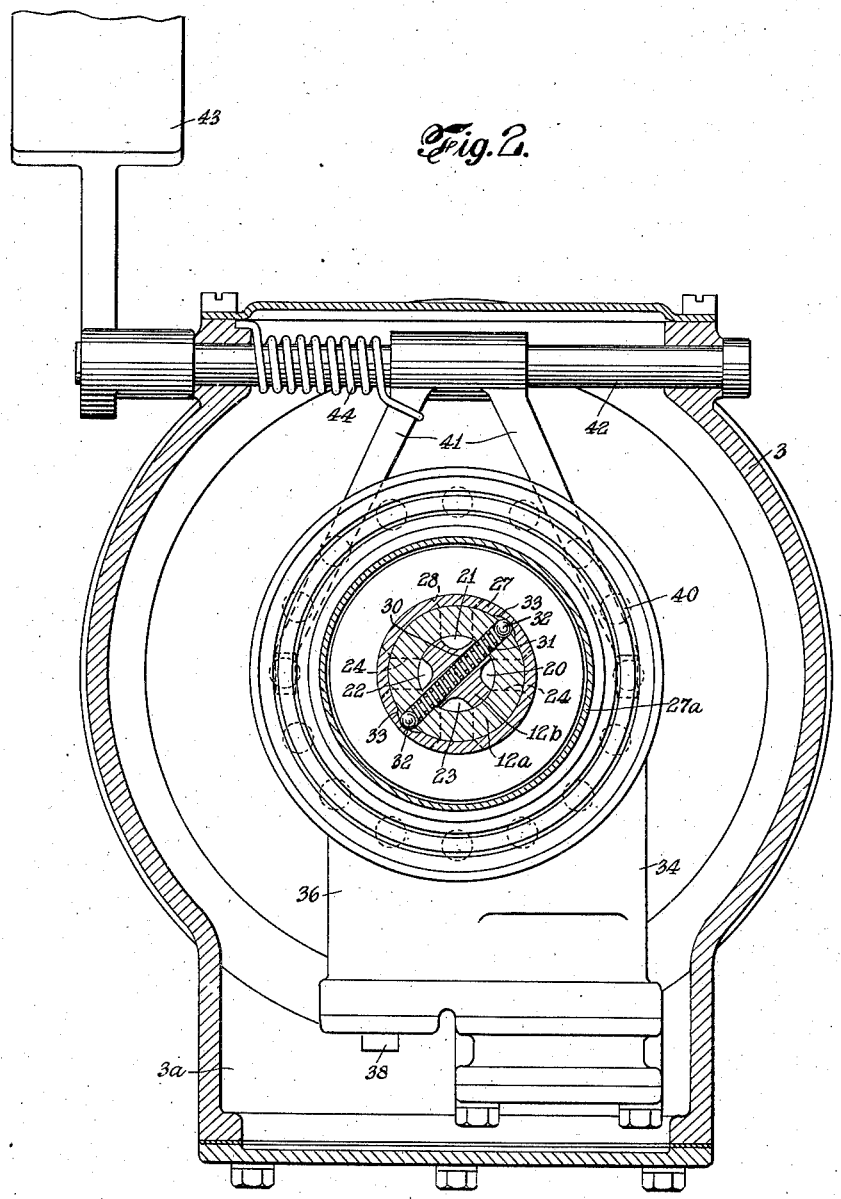

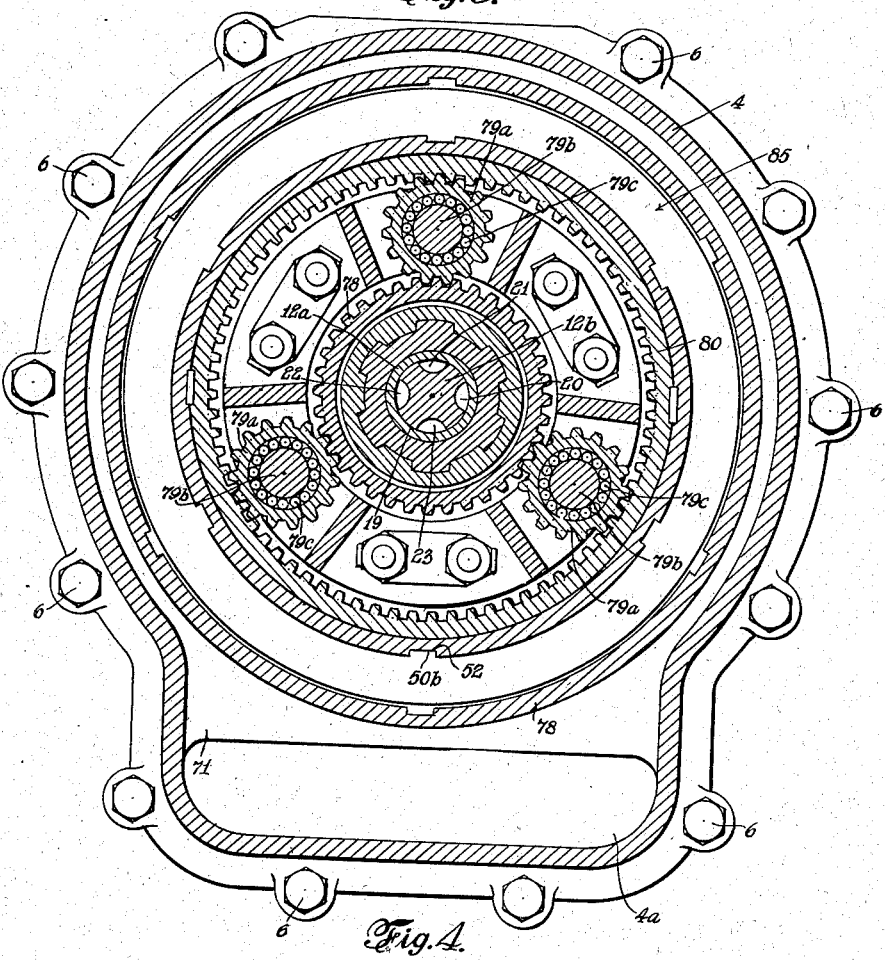
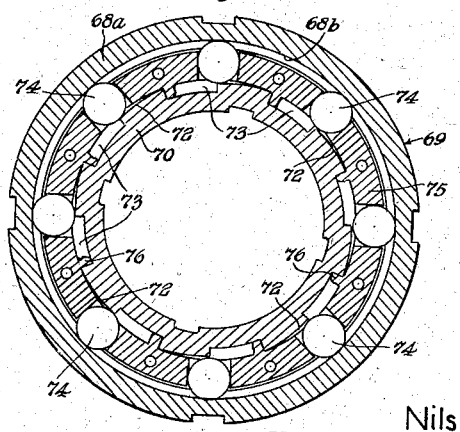

Jan. 17, 1939.   N. A. PALMGREN   2,144,270
VARIABLE SPEED TRANSMISSION MECHANISM
Filed Feb. 27, 1936   4 Sheets-Sheet 4
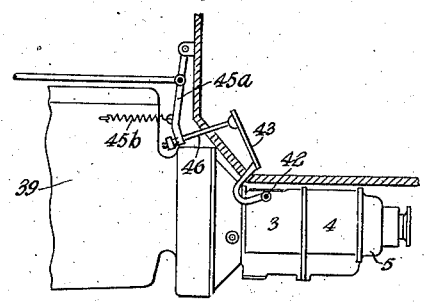
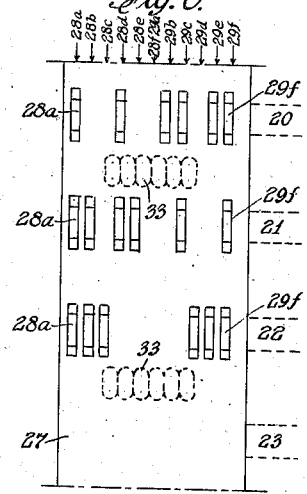
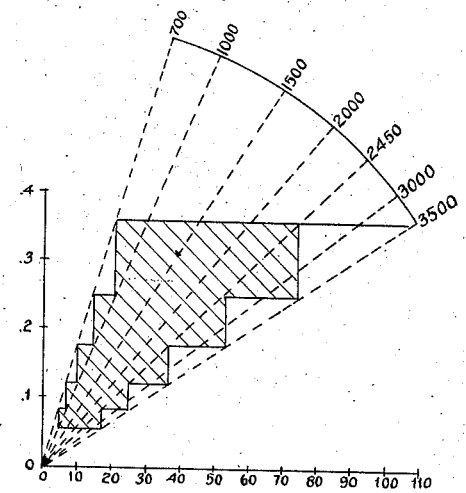
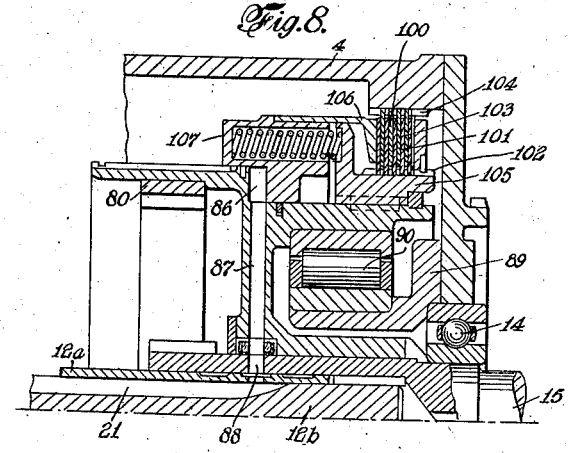
INVENTOR.
Nils Arvid Palmgren
BY
ATTORNEY.

Patented Jan. 17, 1939

2,144,270

UNITED STATES PATENT OFFICE 2,144,270

VARIABLE SPEED TRANSMISSION MECHANISM

Nils Arvid Palmgren, Goteborg, Sweden

Application February 27, 1936, Serial No. 66,007

12 Claims. (Cl. 74—260)

This invention relates to variable-speed power transmission mechanisms of the planetary gear type, and its chief object, briefly stated, is to provide readily operable means for varying the ratio of the velocities of the driving and driven parts and of the torque input and output in a great number of steps with a minimum of operating power and without disconnecting the said parts from the power source or diminishing the input torque.

A special object of my invention is to provide a transmission mechanism by which it is possible for the operator to keep the transmission ratio at all times at a value at which the input torque is a maximum and thereby to increase the economy of the power plant.

A further object of the invention is to provide means for keeping the speed of the primary shaft as low as theoretically possible at any desired output torque and speed.

A further object is to provide a transmission mechanism which is operated exclusively by the will of the operator, as long as the motor runs at a speed above its minimum and to incorporate means for automatically preventing the motor from stalling.

A further object is to provide means for obtaining a powerful motor braking effect at negative output torque.

A still further object is to incorporate power-operated means for the changing of gear ratios and thereby minimizing the operating efforts on the part of the operator.

Still another object is to provide a semi-continuous transmission mechanism by incorporating a relatively great number of transmission ratios.

A special object of the invention is to provide means for combining the operating members of the transmission mechanism and the power source in order to simplify operation.

It is believed that the invention will find its chief utility in the automotive field, and accordingly in the subjoined description it will be explained and discussed with reference to that use, with the understanding however, that it is not limited thereto.

In its preferred form, herein described, my invention possesses a number of important advantages, such as ease and simplicity of operation, with practically no skill required on the part of the driver; greater safety in driving; high efficiency; damage to the mechanism virtually impossible in shifting; ability to shift at high car speeds; impossibility to shift by mistake into a drive ratio at which the engine would act as a brake; rapidity of shifting;—no necessity to disengage main clutch when shifting; no necessity to close the engine throttle when shifting; automatic drive ratio change only to prevent the engine from stalling at low car speeds.

Economically my invention has still greater advantages. The car runs of necessity with the engine throttle fully open when driving in any one but the top drive ratio, as soon as the engine runs at a velocity, higher than its lowest convenient velocity.

On account of this feature of the transmission mechanism the efficiency of the engine is always kept at its highest possible value and the fuel economy of the engine is considerably increased. At the same time any of the transmission drive ratios is readily attainable merely by depressing the accelerator pedal. It is not possible to partly close the engine throttle, without the transmission mechanism running in top drive ratio, above a certain car speed, whereby the engine is spared as much as possible.

Referring to the accompanying drawings, in which the preferred embodiment is shown:

Figure 1 is an elevation view of a mechanism, partly in section, made in accordance with my invention, Figure 2 is a section on the line 2—2 of Figure 1, Figure 3 is a section on the line 3—3 of Figure 1, Figure 4 is a sectional side view of a one way clutch, Figure 5 is a side view of certain external parts of the mechanism as arranged in a car, Figure 6 is a development, on a plane surface, of the distributor sleeve and its openings, Figure 7 is a diagram, illustrating the relation between car speeds, engine velocities and transmission drive ratios, and Figure 8 is a fragmentary sectional view illustrating a modification within the scope of the invention.

With reference to the drawings; the reference character 3 indicates the front part of a transmission housing, 4 the middle part and 5 the rear part of said housing. Part 3 and part 4 are removably secured to each other by bolts 6. Parts 4 and 5 are removably secured to each other by bolts 7. An oil container, 3a, 4a, is provided at the bottom of housing parts 3 and 4. The housing is equipped with a bearing 8, shown as of antifriction type, disposed centrally in the front end of the housing part 3. The bearing 8 receives a hollow shaft 9, provided with a non-detachable dog clutch 10 at its front end and a worm gear 11 at its rear end within the housing 3. The driving shaft 12 is journaled within the hollow shaft 9 and provided with splines 13 at its front end to receive the hub of a conventional main friction clutch disc, not shown. The middle part 4 of the housing supports a bearing 14, receiving an intermediate shaft 15. The rear part 5 of the housing supports two bearings, 16 and 17, receiving the driven shaft 18.

The driving shaft 12 comprises a front part 12a, and a rear part 12b, fitted within a bore 19 in the rear end of shaft part 12a. The shaft part 12b is journaled in a bore in the front end of the intermediate shaft 15 and the rear end of said intermediate shaft 15 is journaled in a bore in the front end of the driven shaft 18. The aligned coincidental axes of driving, intermediate and driven shafts constitute the main axis of the transmission.

The shaft part 12b is provided with four keyways, 20, 21, 22 and 23 respectively, extending from near the front end to near the rear end of the shaft part 12b. The ends of these four keyways are closed by the cylindrical front and rear end parts of shaft 12b being tightly fitted in the bore 19 of the shaft part 12a. These keyways constitute fluid-pressure channels in the driving shaft 12. Opening 24 in the enlarged part 26 of the shaft 12 affords access to the fluid-pressure channel 21 in shaft 12. Similar openings, shown in Figure 2 in dotted lines, afford access to the remaining shaft channels 21, 22 and 23, all four openings being situated in the same radial plane of the shaft 12. Opening 25 in the enlarged part 26 of the shaft 12 is provided for optionally putting the shaft channel 21 in communication with the interior of the transmision housing 3, and similar openings for the remaining shaft channels, all situated in one radial plane.

Surrounding the enlarged part 26 of the shaft 12 and snugly fitted to the same is a distributor sleeve 27, acting as a valve member and is mounted axially movable in relation to the shaft 12 and rotating therewith and provided with openings 28 for optionally communicating with the shaft channels and openings 29 for putting the shaft channels into communication with the interior of the transmission housing when the sleeve 27 closes the openings 24 in the shaft 12. In a bore 30 in the shaft 12, shown in Figure 1 and Figure 2, is placed a spring plunger, consisting of a coil spring 31 and two balls 32, snapping in grooves 33 in the bore of the distributor sleeve 27. A number of grooves 33, shown in dotted lines in Figure 6 are cut in the bore of said sleeve, in two diametrically opposed rows, and axially spaced for determining the different axial positions of the distributor sleeve 27, the axial distance between two adjacent grooves 33 being equal to the axial distance between the openings 28 mutually as well as the openings 29 mutually.

Surrounding the shaft 12 and the distributor sleeve 27 is a housing part 34 snugly fitting the outside of said distributor sleeve. A fluid-pressure channel 35 in said housing 34, communicating with the pressure side of a fluid pump 36 of the Imo-screw type, built into the housing 34. A circumferential opening 37 is arranged in the bore of the housing part 34 in the same radial plane as the openings 24 in the shaft 12, through which fluid-pressure may be transmitted from the pump 36 to the different fluid-pressure channels and working chambers of the mechanism. The fluid-pressure generated by the pump 36 is limited by means of a conventional pressure limiting valve 38. The pump screw 36a is driven from the hollow shaft 9 by the worm gear 11. Said shaft 9 in its turn is driven directly by the engine 39 through the non-detachable dog clutch 10, whereas the driving shaft 12 is driven by said engine through a conventional detachable main friction clutch, not shown, fitting the splined front end 13 of the shaft 12.

An operating bearing 40 of the antifriction type is mounted on part 27a of the distributor sleeve member 27, the stationary outer race of which bearing may be pushed axially at will in a direction toward the rear of the mechanism by means of a fork 41, fitted to a transverse shaft 42, rockably supported by the transmission housing 3. A pedal 43 is keyed to the shaft 42 for operating the mechanism and a pedal return spring 44 urges the pedal back to release the operating bearing 40 and the distributor sleeve 27, when the foot is raised from the pedal. The pedal 43 cooperates with the throttle operating lever 45a of the engine 39, shown in Figure 5. For this purpose the link 46 is rockably fixed to the pedal 43 and adapted to pull back the lever 45a to close the engine throttle when the foot is raised from the pedal, whereas a spring 45b moves the lever 45a to open the throttle, when the pedal 43 is depressed.

Keyed to the shaft 12 there is a ring gear member 47 of a first planetary gear unit, said first planetary gear unit being constituted by the sun gear member 48, the planetary pinion member 49 and the ring gear member 47. The ring gear member 47 cooperates with a plurality of annular friction clutch discs 50a, surrounding said ring gear member and axially movable within limits in relation thereto and provided with lugs 50b, projecting into longitudinal grooves 52, cut in the ring gear member 47. Surrounding the ring gear member 47 and axially movable in relation thereto there is further an annular clutch actuating member 53, having a greater bore diameter at the end 54 facing the clutch discs 50a and a smaller bore diameter at the opposite end 55, said bores loosely fitting corresponding outside diameters of the ring gear member 47. Said ring gear member and the annular clutch actuating member 53 thus enclose an annular fluid-pressure working chamber 56, effectively sealed by piston ring packings 57 and communicating only with the shaft fluid-pressure channel 20 through channel 58 in the ring gear member 47.

Between the flange 59, fixed to the ring gear member 47 and the annular clutch actuating member 53, a set of helical clutch springs 60 is interposed, urging the clutch actuating member 53 in a direction toward the clutch discs to engage the clutch. The clutch actuating member 53 may be backed off leftwardly in Figure 1 away from the clutch discs 50a against the tension of the springs 60 by the introduction of fluid pressure in said fluid-pressure working chamber 56, in which event the clutch is disengaged. The sun gear member 48 is provided with an extension 61 carrying a plurality of annular friction clutch discs 51a axially movable in relation to said extension and prevented from rotating in relation thereto by means of lugs 51b and corresponding longitudinal grooves 63 in the bore of the extension 61. These last mentioned clutch discs 51a are interposed between respective clutch discs 50a to complete the multiple disc friction clutch 62, optionally connecting the ring gear member 47 and the sun gear member 48 of said first planetary gear unit. The sun gear member 48 is journaled on the tubular part of clutch part 66b of the sun gear member 66 of a second planetary gear unit, described below.

The second planetary gear unit comprises a ring gear member 64, a planetary pinion member 65 and a sun gear member 66. The planetary pinion members 49 and 65 of the first and second planetary gear units respectively are connected in that the planetary pinion 49 is journaled on the same shaft 67 as is the planetary pinion 65. The planetary pinion carrier is common to both said members 49 and 65 and is journaled on the sun gear member 48 on one side and on the ring gear member 64 on the other side. The sun gear member 48 of the first planetary gear unit receives the outer ring 68a of a one way clutch 69 of the roller type, the inner ring 70 of which is keyed to the fixed housing part 71, interposed between housing parts 3 and 4 and held by the bolts 6. This one way clutch 69 is shown in sectional side view in Figure 4. The raceway 68b of the outer ring 68a is purely cylindrical, whereas the outer surface of the inner ring 70 is provided with spiral parts 72 and axial grooves 73 interrupting said spiral parts. A roller 74 is introduced between the outer raceway 68b and each one of the spiral surface parts 72 of the inner ring 70, the rollers being correctly spaced apart by a retainer 75. The retainer 75 and the set of rollers 74 are shown in Figure 4 in the free-wheeling position, determined by the lugs 76 of retainer 75, contacting with one side of the respective groove 73. A clockwise rotation in Figure 4 of the outer ring 68a results in a rotation of the set of rollers 74 and the retainer 75 until the rollers interfere with the spiral surfaces 72 of the inner ring 70 and the raceway 68b of the outer ring 68a and thereby lock the clutch. The one way clutch 69 prevents the sun gear member 48 from rotating in the reverse direction.

The ring gear member 64 of the second planetary gear unit is splined to the tubular shaft 77, in its turn splined to the sun gear member 78 of the third planetary gear unit, constituted by the sun gear member 78, the planetary pinion member 79 and the ring gear member 80. The sun gear member 66 of the second planetary gear unit is built up by the gear wheel 66a and the clutch part 66b splined to each other. The clutch part 66b is journaled on the tubular shaft 77 and carries a multiple disc friction clutch 82, similar to the clutch 62, and optionally connecting the sun gear member 66 and the fixed housing part 71. In this clutch the fluid-pressure working chamber 83 communicates with the shaft channel 21 through a channel 84 in the clutch part 66b and openings 81 in the tubular shaft 77. The clutch part 66b is connected to the sun gear member 78 of the third planetary gear unit by means of a one way clutch 84a of the same design as shown in Figure 4. This one way clutch 84a prevents the sun gear member 66 from rotating faster than the ring gear member 64.

The planetary pinion member 79 of the third planetary gear unit is splined to the intermediate shaft 15. The ring gear member 80 is journaled on said shaft 15. A multiple disc friction clutch 85 of the design described above, is attached to said ring member 80 and optionally connecting said member 80 and the sun gear member 78. The fluid-pressure working chamber 86 of said clutch 85 communicates with the shaft channel 21 through channels 87 in the ring gear member 80 and openings 88 in the intermediate shaft 15. The ring gear member 80 is connected to the fixed housing part 89, fastened to the housing part 4 by the bolts 89a, by the one way clutch 90 of the type described above. This one way clutch 90 prevents the ring gear member 80 from rotating in the reverse direction.

Splined to the intermediate shaft 15 there is a sun gear member 91 of a fourth planetary gear unit, the planetary pinion member 92 of which carries a dog clutch sleeve 94 splined to said member 92. This dog clutch sleeve 94, which is operatively associated with a hand lever, not shown, is shown in Figure 1 in a neutral position. Moving the sleeve 94 to the left of Figure 1 to engage the fixed housing part 4, the planetary pinion member 92 is immobilized and the ring gear member 93 is rotatable in the reverse direction. Moving the sleeve 94 to the right in Figure 1 to engage the ring gear member 93, the said fourth planetary gear is rotatable as a rigid unit in the forward direction. The ring gear member 93 is splined to the driven shaft 18.

The planetary pinions 49, 65, 79a and 92a of the respective planetary gear units are journaled on shafts 67, 79b and 92b, a plurality of cylindrical bearing rollers 79c being interposed between the bores of the pinions and the respective shafts, as shown in Figures 1 and 3 and said shafts being secured to the respective gearing members at a distance from the main axis of the mechanism and parallel thereto.

The development of the distributor sleeve 27 in Figure 6 shows the position of the openings 28 and 29 in said sleeve and, in dotted lines, the position of the grooves 33. There is one row of openings corresponding to each shaft channel 20, 21 and 22 and perpendicular thereto there are two series of openings, designated 28 and 29 respectively, corresponding to the openings 24 and 25 respectively of the shaft 12. One circumferential row of openings in each of the mentioned two series and two grooves 33, diametrically opposed, correspond to each axial position of the distributor sleeve 21.

The shaft channel 23 only collects leaking oil and conveys said oil to the gearing for lubricating purpose.

In sleeve position a, the openings 28a give access for the pressure fluid to the shaft channels 20, 21 and 22 and the working chambers 56, 83 and 86 of the friction clutches 62, 82 and 85 respectively and fluid pressure disengage said clutches. The sun gear unit 48 is therefore prevented from rotating in reverse direction by the one way clutch 69 attached thereto, and the first planetary gear unit is working. The ring gear member 80 is prevented from rotating in reverse direction by the one way clutch 90 and therefore the third planetary gear unit is working. The sun gear member 66 is prevented from running faster in the forward direction than the ring gear member 64 by the one way clutch 84, and the second planetary gear therefore rotates as a rigid unit. In the described case the gearing runs in first or lowest drive ratio. The expression "drive ratio" as used here always means the output velocity, divided by the input velocity.

In distributor sleeve position b, the openings 28b continue to afford fluid-pressure access to the shaft channels 21 and 22, whereas the opening 29b opens the shaft channel 20 and permits the fluid in said channel and in the working chamber 56 of the clutch 62 to escape into the transmission housing. In this case the clutch springs 60 engage the clutch 62 and the first planetary gear revolves as a rigid unit. This is second drive ratio.

In sleeve position c, there is only one opening 28c, giving access to the shaft channel 22, whereas the shaft channels 20 and 21 are opened by the slots 29c. In this case the clutch 82 is engaged and the second planetary gear starts to work, giving third drive ratio.

In sleeve position d, the openings 28d introduce fluid-pressure in channels 20 and 21, the clutches 62 and 82 are disengaged, whereas opening 29d causes clutch 85 to be engaged. The first planetary gear unit works and the second and third planetary gears revolve as rigid units. This is fourth drive ratio.

In sleeve position e, the opening 29e opens the shaft channel 20 and all three planetary gears revolve as rigid units. This is fifth drive ratio.

And finally in sleeve positon f, all the shaft channels 20, 21 and 22 are opened by the slots 29f, causing the first and third planetary gears to revolve as rigid units, whereas the second planetary gear unit works. This is sixth or top drive ratio.

The section through the distributor sleeve member 27 in Figure 1 shows said sleeve member in position e, described above, corresponding to fifth drive ratio or direct drive.

A set of centrifugal weights 95 are pivotally mounted on transverse axles 95a at the front side of flange 59 and are capable of rocking within limits in an axial plane of the gearing main axis. Centrifugal weight return coil springs 96 cooperate with the centrifugal weights 95 and the flange 59. The centrifugal force at rotation of the driving shaft 12 tends to displace the centrifugal weight outwardly, whereas the return springs 96 counteract this tendency. The centrifugal weight 95 is provided with a distributor sleeve operating arm 97, cooperating with the flange 98 on the distributor sleeve member part 27a and capable of moving the distributor sleeve axially to the right in Figure 1 against tension of the distributor sleeve return coil spring 99, interposed between the distributor sleeve member 27 and the ring gear member 47. At high angular velocities of the driving shaft 12, the centrifugal weights are thrown outwardly, extending the springs 96 and releasing the distributor sleeve member 27. At the lowest convenient velocity of the driving shaft 12, say for instance 700 revolutions per minute the axial force exerted by the springs 96 on the distributor sleeve 27 through the intermediary of the arm 97 and flange 98, is equal to the sum of the axial forces on said member 27 exerted by the centrifugal force on weights 95, the return spring 99 and the resistance force of the spring plunger 32. If the velocity of the shaft 12 diminishes to come below this limit, the distributor sleeve is moved one step to the rear, that is to the right in Figure 1, causing the transmission mechanism to change its drive ratio one step to a lower ratio. At about constant car speed, the engine velocity is therefore increased correspondingly, but the forces acting on the distributor sleeve 27 are so chosen, that the new drive ratio remains in spite of the increased centrifugal force. To alter the drive ratio back to its higher value, it is required that the sum of the centrifugal weight force and the distributor sleeve return spring force on the sleeve is equal to the sum of the centrifugal weight return spring force and the spring plunger resistance force on said sleeve. This can be made to occur at an angular velocity of the driving shaft 12, which is higher than the lowest convenient velocity of said shaft, multiplied by the step up ratio between two neighboring drive ratios of the transmission mechanism. For this purpose the forces acting may be chosen in accordance with the following example. The distributor sleeve return spring force is 6 lbs. the spring plunger resistance 2 lbs. in either direction, the centrifugal force transmitted to the distributor sleeve 2 lbs. at 700 R. P. M. and 6 lbs. at 1200 R. P. M., and the centrifugal weight return spring force transmitted to the distributor sleeve 10 lbs. To move the distributor sleeve 27 to the right in Figure 1, the centrifugal weight return spring force, 10 lbs. must be equal to the sum of the distributor sleeve return spring force, 6 lbs. the spring plunger resistance, 2 lbs. and the centrifugal force. This will be the case when the last mentioned force is 2 lbs. that means at 700 R. P. M. To move the sleeve to the left in Figure 1, the sum of the distributor sleeve return spring force, 6 lbs. and the centrifugal force must be equal to the sum of the centrifugal weight return spring force, 10 lbs. and the spring plunger resistance, 2 lbs. which is the case when the centrifugal force is 6 lbs. that means at 1200 R. P. M. If now the two neighboring drive ratios of the transmission mechanism are 1.0 and 1.43, for instance, the driving shaft 12 is allowed to speed up from 700 R. P. M. to 1000 R. P. M. when drive ratio changes from 1.43 to 1.0 at constant car speed. But this velocity increase is not sufficient as indicated above, to cause the mechanism to immediately change back to 1.43. In this way the automatic, centrifugally operated mechanism is stable.

To operate the distributor sleeve 27 at high engine velocities by the aid of the accelerator pedal 43, an axial force amounting to 8 lbs. is required in the above mentioned example, corresponding to 4 lbs. on the pedal, if the pedal lever is twice as long as the fork 41. If now a force of say 4 lbs. must be exerted on the pedal to twist the pedal return spring 44, the whole operating force for changing drive ratio is only 8 lbs.

In the described and illustrated embodiment of my invention, the numbers of teeth of the different gear wheels are the following, namely for:

Planetary pinion of the first and second units_ 19
Sun gear of the first and second units_____ 29
Ring gear of the first and second units_____ 67
Planetary pinion of third and fourth unit_____ 17
Sun gear of third unit_____ 37
Ring gear of third unit_____ 71
Sun gear of fourth unit_____ 25
Ring gear of fourth unit_____ 59

Accordingly the forward drive ratios of the described gearing are the following:
  0.24; 0.35; 0.50; 0.70; 1.00; 1.43
and the reverse drive ratios:
  0.10; 0.15; 0.21; 0.30; 0.42; 0.60

Assuming a back axle gear drive ratio of 13 to 51, or 0.255, the following drive ratios of the entire car transmission in forward drive are available, namely:

0.061; 0.089; 0.127; 0.178; 0.255; 0.365

In accordance with the described features of the mechanism, the relation between the car speed, engine velocity and drive ratio of the entire car transmission is plotted in Figure 7, assuming a maximum engine velocity of 3500 R. P. M. and a rolling radius of the car wheels of 14 inches. The horizontal axis of the diagram indicates car speed in miles per hour, and the vertical axis drive ratio. The dotted vectors indicate engine velocity in R. P. M. The shaded area in the diagram indicates the practically possible drive ratio range as a function of the car speed. At for instance, 45 M. P. H. the engine runs at 1500 R. P. M. on the top drive ratio 0.365, the engine throttle being operated between idling and full load positions, according to the road resistance. To maintain the said car speed when running uphill, it may be necessary to increase the wheel torque above its maximum obtainable by merely opening the throttle. This is possible by depressing the accelerator pedal beyond its full-throttle position to shift into fifth or even into fourth drive ratio. If it were attempted, however, to shift into third drive ratio, the necessary engine velocity for propelling the car would not be available. Therefore a shifting into third drive ratio would result in free-wheeling until the car speed falls below 37 M. P. H. At 21 M. P. H. the automatic centrifugal device starts actuating the transmission mechanism to decrease the drive ratio and keep the engine velocity above 700 R. P. M. independent of the throttle position. But at the same time any still lower drive ratio may be readily obtained at will by sufficient depression of the accelerator pedal. Above a car speed of 21 M. P. H. the engine throttle is fully opened when driving on any one but top drive ratio, whereas below 21 M. P. H. any throttle position is possible as long as the drive ratio determined by automatic device is working. In consequence the transmission permits comfortable driving at all car speeds between about 3.5 and 105 miles per hour, subject to the limitations set by the available engine power.

The transmission mechanism operates as follows: The hand lever being put in neutral position, the dog clutch sleeve 94 is brought to its middle position, shown in Figure 1. The planetary pinion member 92 is then idling and no torque can be transmitted to the driven shaft 18. The engine having been started, the hollow shaft 9 is steadily rotating and driving the pump 36. Fluid pressure is then available. By depression of the main friction clutch pedal the driving shaft 12 is disconnected from the engine, and the dog clutch sleeve 94 may readily be moved rearwardly to engage the ring gear member 93. Now the driving shaft 12 is not rotating, and the centrifugal weight return springs 96 force the distributor sleeve 27 rearwardly, by the described means, to its extreme position, corresponding to position a, as described with reference to Figure 6, which gives the first or low drive ratio. The main clutch pedal now being raised, the driving shaft 12 is connected to the engine and the car starts, the transmission mechanism running on first low drive ratio until the engine velocity exceeds a predetermined value, say 1200 R. P. M.

At this point, the centrifugal force on weights 95 is great enough to permit the distributor sleeve 27 to be moved by spring 99 to position b, resulting in a change into second drive ratio and a reduction of engine velocity to 70 percent of its former value. The engine again speeding up to 1200 R. P. M., the third drive ratio is obtained, and so on.

If however, the accelerator pedal is depressed farther than to its middle position, the fork 41 keeps the operating bearing 40 and consequently the distributor sleeve 27 in any desired position to the rear of the sleeve position determined by the centrifugal regulator device, thereby preventing the gearing from changing to higher drive ratios and giving any acceleration desired, within the capacity of the engine. Raising of the accelerator pedal at high engine velocity and low drive ratio results in a forward motion of the distributor sleeve 27 and a higher drive ratio.

As soon as the top drive ratio is arrived at, a further raising of the accelerator pedal only results in a successive closing of the engine throttle. Releasing the accelerator pedal entirely at high car speeds results in a moderate braking effect, as the transmission mechanism has no free-wheeling property on top drive ratio, no one of the one way clutches transmitting torque on top drive. Coasting or braking the car to run below a predetermined speed, say 21 M. P. H., corresponding to 700 R. P. M. of the engine in the example taken above, the centrifugal regulator causes the mechanism to change to a lower drive ratio until the minimum car speed is reached, when it is necessary to disengage the main clutch in the usual way to prevent the engine from stalling.

For reverse driving, the dog clutch sleeve 94 is brought to engage the housing part 4. The planetary pinion member 92 is then prevented from rotating as a whole; only the planetary pinions 92a therein are free to rotate about their respective axles 92b, driving the ring gear member 93 and the driven shaft 18 in a reverse direction. On reverse gear also six different drive ratios are available.

Starting the engine by the aid of the inertia of the running car is possible, because the hollow shaft 9 and therefore the pump 36 is stationary when the engine is stationary. All the fluid-pressure actuated clutches of the mechanism are therefore engaged by their respective clutch springs and the device is in top drive ratio. The top drive ratio is suitable for the purpose, as it has no free-wheeling capacity and applies a high torque to the engine.

It will be noted that the transmission mechanism in its preferred form, described above, is not to be regarded as an automatic transmission, since the gear changes as a rule are fully dependent on the driver's will. But the transmission automatically prevents the engine from stalling at low car speeds and keeps the engine velocity as low as possible at low, but increasing car speeds. This automatic action cannot possibly be considered as confusing to the driver in any way.

It may be desired to incorporate means in the transmission mechanism for making a more powerful motor braking effect possible than that obtainable on top gear. Figure 8 shows such means, consisting of a friction clutch 100 connecting the ring gear member 80 of the third planetary gear unit and the fixed housing part 4. Keyed to the ring gear member 80, there is an inner clutch member 105, surrounded by friction clutch discs 101, held by grooves 102 in member 105. Interposed between such clutch discs 101 there are corresponding clutch discs 103 resting in the housing part 4 and held by grooves 104 therein. The discs of the clutch 100 may be pressed together by part 106, abutting against the axially movable clutch operating part 107, belonging to the friction clutch 85, shown in Figure 1. If now the distributor sleeve 27 is put in position c to give third drive ratio, fluid-pressure is introduced in the working chamber 86, the clutch 85 is disengaged and the clutch 100 is engaged. Therefore the connection between the driving shaft 12 and the intermediate shaft 15 is positive and torque may be transmitted from the wheels to the motor, giving the desired braking effect.

It is to be understood that the invention is not limited to the construction herein specifically described, but can be embodied in other forms without departure from its spirit.

Having thus described my invention, I claim and desire to secure by Letters Patent:

1. A transmission mechanism comprising driving and driven elements, and at least three coaxial planetary gear units operatively associated respectively with said elements and with each other and jointly constituting a variable speed gearing connecting said elements, the driving element being connected to the ring gear member of the first adjacent gear unit, the planetary pinion member of said first gear unit being connected to the planetary pinion member of the second gear unit, the ring gear member of said second unit being connected to the sun gear member of the third gear unit and the planetary pinion member of said third gear unit being connected to the driven element.

2. A transmission mechanism comprising driving and driven elements, and at least three coaxial planetary gear units operatively associated respectively with said elements and with each other and jointly constituting a variable speed gearing connecting said elements, the driving element being connected to the ring gear member of the first adjacent gear unit, the planetary pinion member of said first gear unit being connected to the planetary pinion member of the second gear unit, the ring gear member of said second unit being connected to the sun gear member of the third gear unit and the planetary pinion member of said third gear unit being connected to the driven element, a friction clutch for optionally connecting the sun gear member and the ring gear member of the first gear unit, a one way clutch operative on the sun gear member of said first gear unit and a fixed member, a friction clutch for optionally arresting the sun gear member of the second gear unit, a one way clutch operative on the sun gear member of said second gear unit and the sun gear member of the third gear unit, a friction clutch for optionally connecting the sun gear member and the ring gear member of said third gear unit, and a one way clutch for arresting the ring gear member of said third gear unit.

3. In a transmission mechanism, in combination; a shaft; a planetary gear unit, coaxial with said shaft; an operable clutch attached to a member of said planetary gear unit; an axially movable annular clutch member for actuating said clutch and constituting together with said planetary gear member an annular fluid pressure working chamber, said clutch member being actuated by a fluid pressure in said working chamber to disengage said clutch.

4. In a transmission mechanism, in combination; a shaft; a planetary gear unit coaxial with said shaft; a fluid-pressure actuated clutch attached to a member of said planetary gear unit; the said shaft having a fluid-pressure channel communicating with the working chamber of said clutch; a distributor sleeve member mounted on said shaft and axially movable in relation thereto and provided with openings, optionally communicating with said fluid pressure channel in said shaft; means for moving said distributor sleeve member in one axial direction; and a distributor sleeve return spring, urging said distributor sleeve member in the opposite direction; a foot actuated member operable at will to move the distributor sleeve member opposite to the direction of the distributor sleeve return spring force on said distributor sleeve member; and a foot actuated member return spring, releasing the distributor sleeve member when the said foot actuated member is released.

5. In a transmission mechanism, in combination, a shaft; a planetary gear unit, coaxial with said shaft; a fluid-pressure actuated clutch attached to a member of said planetary gear unit, there being a fluid-pressure channel in said shaft, communicating with the working chamber of said clutch; a distributor sleeve member, movably mounted on said shaft and provided with openings, optionally communicating with said fluid-pressure channel; and a spring plunger, cooperating with said distributor sleeve member and said shaft and offering a limited resistance against the motion of said distributor sleeve member in relation to said shaft.

6. In a transmission mechanism according to claim 5, a distributor sleeve return spring, urging the distributor sleeve member in one direction in relation to the shaft, the force imposed on said distributor sleeve member by said distributor sleeve return spring being greater than the spring plunger resistance.

7. A transmission mechanism comprising a driving shaft; a plurality of planetary gear units, coaxial with said shaft; fluid pressure actuated clutches, attached to members of said planetary gear units respectively; there being fluid pressure channels in said shaft communicating with the working chambers of said clutches respectively; a distributor sleeve member, movably mounted on said shaft and provided with openings optionally communicating with the said shaft fluid-pressure channels; a centrifugal regulator, rotatable with said driving shaft and comprising a centrifugal weight, a centrifugal weight return spring counteracting the centrifugal force on said weight; means for connecting the centrifugal weight and the distributor sleeve member, said centrifugal regulator forcing said distributor sleeve member in one axial direction when the centrifugal weight return spring force on said distributor sleeve member exceeds the centrifugal weight force on said distributor sleeve member.

8. In a transmission mechanism according to claim 7; a distributor sleeve return spring, urging the distributor sleeve member in one axial direction; a spring plunger, cooperating with said distributor sleeve member and the driving shaft and resisting a limited axial force between said distributor sleeve member and the driving shaft, the sum of the distributor sleeve return spring force, the spring plunger resistance force and the centrifugal weight force on said distributor sleeve member, all said forces acting in the same direction, being equal to the centrifugal weight return spring force on said distributor sleeve; a member at the lowest convenient angular velocity of said driving shaft.

9. In a transmission mechanism according to claim 7; a distributor sleeve return spring, urging the distributor sleeve member in one axial direction; a spring plunger, cooperating with the said distributor sleeve member and the driving shaft and resisting a limited axial force between said distributor sleeve member and said driving shaft, the sum of the centrifugal weight force and the distributor sleeve return spring force on said distributor sleeve member, both acting in one axial direction, being equal to the sum of the centrifugal weight return spring force and the spring plunger resistance force on said distributor sleeve member at an angular velocity of said driving shaft, which is higher than the lowest convenient angular velocity of said driving shaft, multiplied by the step up ratio between two neighboring drive ratios of the transmission mechanism.

10. In a transmission mechanism according to claim 1; a brake optionally arresting the ring gear member of third gear unit.

11. A transmission mechanism comprising driving and driven elements, and planetary gear units operatively associated respectively with said elements and with each other and jointly constituting a variable speed gearing connecting said elements, means for transmitting torque from the driving element to the planetary pinion member of one coaxial planetary gear unit, the ring gear member of the said planetary gear unit being connected to the sun gear member of a second planetary gear unit, the planetary pinion member of the said second planetary gear unit being connected to the driven element and a brake for optionally arresting the sun gear member of the first gear unit.

12. A transmission mechanism comprising driving and driven elements, and planetary gear units operatively associated respectively with said elements and with each other and jointly constituting a variable speed gearing, connecting said elements, means for transmitting torque from the driving element to the planetary pinion member of one coaxial planetary gear unit, the ring gear member of the said planetary gear unit being connected to the sun gear member of a second planetary gear unit, the planetary pinion member of the said second planetary gear unit being connected to the driven element, a friction clutch for optionally arresting the sun gear member of the first mentioned gear unit, a friction clutch for optionally connecting the sun gear member and the ring gear member of said second gear unit and a one way clutch for arresting the ring gear member of said second gear unit.

NILS ARVID PALMGREN.